Dec. 29, 1936. V. G. SHINKLE 2,065,619
OIL PURIFICATION AND FRACTIONATION AND APPARATUS FOR SAME
Filed Feb. 14, 1931 7 Sheets-Sheet 2

INVENTOR
Vincent G. Shinkle
BY his ATTORNEYS
Kenyon & Kenyon

Dec. 29, 1936.　　　V. G. SHINKLE　　　2,065,619
OIL PURIFICATION AND FRACTIONATION AND APPARATUS FOR SAME
Filed Feb. 14, 1931　　　7 Sheets-Sheet 4

INVENTOR
Vincent G. Shinkle
BY his ATTORNEYS
Kenyon & Kenyon

Dec. 29, 1936.   V. G. SHINKLE   2,065,619
OIL PURIFICATION AND FRACTIONATION AND APPARATUS FOR SAME
Filed Feb. 14, 1931   7 Sheets-Sheet 5

INVENTOR
Vincent G. Shinkle
BY his ATTORNEYS
Kenyon & Kenyon

Dec. 29, 1936.  V. G. SHINKLE  2,065,619
OIL PURIFICATION AND FRACTIONATION AND APPARATUS FOR SAME
Filed Feb. 14, 1931  7 Sheets-Sheet 7

INVENTOR
Vincent G. Shinkle
BY his ATTORNEYS
Kenyon & Kenyon

Patented Dec. 29, 1936

2,065,619

UNITED STATES PATENT OFFICE 2,065,619

OIL PURIFICATION AND FRACTIONATION AND APPARATUS FOR SAME

Vincent G. Shinkle, New York, N. Y., assignor to Motol, Inc., New York, N. Y., a corporation of Delaware Application February 14, 1931, Serial No. 515,667

12 Claims. (Cl. 196—16)

This invention relates to the purification and refining of oils. It is addressed particularly to the removal from oils of foreign solid and liquid matters and to separation of oil into desired fractions.

It is a purpose of this invention to provide efficient economical means whereby crude stock may be purified, and after purification vaporized, condensed and rectified for the production of lubricating oil fractions of high quality.

This invention is applicable, for example, to the purification and rectification of used crank case oil. A variety of impurities may be contained in used crank case oil such as carbon, dirt, and other foreign solid substances. Moreover, used crank case oil may contain contaminating liquids, such as water which may be present in the form of emulsion. Emulsifying agents such as fatty acids, resins, gums and soaps are frequently encountered in used crank case oil. Where such substances are present, liquids, such as water, may be present and also contribute to the formation of emulsions which are stabilized by such emulsifying agents and which are very difficult to break. Moreover, other impurities may likewise be held in an emulsified or suspended condition by such agents. Used crankcase oil frequently is also contaminated by liquid hydrocarbons which are unsuitable for lubricating oil purposes, e. g., kerosene or gas oils which are frequently present to the extent of 10% to 15% and which occasionally run as high as 25%. Moreover, used crank case oils practically uniformly are composed of a mixture of lubricating oils from different base crudes which it is desirable to separate into fractions appropriate for re-use for lubricating oil purposes.

While this invention has been described as applicable to the purification and fractionation of used crank case oils, it is also applicable to any other lubricating oil distillate. While it is applicable to composite distillates representing mixtures of oils from different crudes, it is also applicable to lubricating oils which have been straight cut.

It is immaterial from what source oil to be purified is derived as the oil may be crude petroleum oil, or a fraction, such as a distillate or residue thereof, or vegetable oil, or animal oil, or oil produced in the destructive distillation of carbonaceous material or shale.

Treatment of crude charging stock is accomplished according to this invention in a number of process steps and utilizing various apparatus. The steps and apparatus comprising this invention may be employed separately and when so employed constitute separate parts of this invention. They may also be employed conjointly and when so employed cooperate with one another to produce the special advantages resulting from their cooperation.

According to this invention, crude charging stock after it has been preliminarily treated according to well known means for removal of the bulk of the impurities contained therein, is treated to remove any remaining impurities and to break up emulsions, e. g. water emulsions. To this end it is a feature of this invention that the partially purified stock is permitted to rise gradually in a large treating tank and to pass, near the top of the treating tank, through a mat of excelsior prior to being discharged therefrom for further treatment. The excelsior appears to have an affinity for moisture and colloidal substances in the crude stock and also serves to break up emulsions. It also permits free flow of oil and does not clog. Further advantages of such construction are that it is very efficient in producing the desired result and is of economical construction and operation.

After the crude charging stock has been purified, it is then vaporized. According to this invention, this is accomplished by first preliminarily heating the oil by heat exchange with steam which may be saturated but which is preferably wholly or partially super-heated. The oil is then atomized in contact with steam in the tubes of a still. This method of heating has been advantageously combined in a single still by admitting oil into a coil encased in a pipe which may rest in the bottom of the furnace. Steam is admitted into this casing and, as the casing picks up a great deal of radiant and sensible heat from the hot gases in the furnace, the steam therein is partially super-heated and the heated steam serves to heat the oil which is in a liquid state in the coil. The heated oil is then brought under pressure to the super-heating coils of the still where it is atomized. The partially super-heated steam may also be discharged into the super-heating coils and is discharged preferably at a point just back of the oil atomizer so that the oil will be atomized into a current of steam. Due to the heat of the steam and the heat of the super-heating coil, the finely-divided oil is flashed into a vapor. The mixture of oil vapor and super-heated steam is thereupon passed through the super-heating pipes until the mixture reaches the desired temperature for fractionation.

An advantage of the still construction of this invention is that the oil in liquid stage is not subjected to direct furnace heat, thus avoiding overheating beyond the point of molecular instability. Moreover, while oil is in the liquid state, controlled heat is applied uniformly to all parts of the pipe in which it is being heated, avoiding local overheating. It is a further advantage of this invention that when the oil is discharged into the super-heating coils of the still, it is not impinged upon the hot walls of the pipe but is protected from so doing by the flow of superheated steam. Moreover by enlarging the portion of the super-heating coil where the oil is introduced therein, the likelihood of the atomized oil striking the walls of the tube is further decreased. By this means oil may be quickly heated and at the same time there is avoided disadvantageous local overheating with consequent breaking up of the molecule which would occur were the oil in being heated brought directly in contact with highly heated surfaces, as heretofore practiced.

After the vapors have been brought to a suitably high temperature, they are carried to a multiple condenser or dephlegmator unit. The condensing unit according to this invention is of novel construction and operation and may consist of a number of bubble tower sections connected by novel means and having novel bubble cups and bubble plates and run down lines. Various desired fractions are taken by removing condensed fractions accumulated in the bottoms of the various bubble tower sections and on plates thereof and may be removed as desired, cooled and taken to run down tanks. The accumulation of condensible fractions in the several sections and on the plates thereof may be controlled by pumping reflux oil into the top of any one or more sections and by introducing superheated steam into the sections.

Inasmuch as the multiple condenser or dephlegmator may operate under a vacuum of from 26" to 28" of mercury, it is an advantage of this invention that this unit is placed about 45 or more feet above the ground so that the condensed fractions may be drawn off through coolers to the run down tanks through a barometric leg or by their own hydrostatic pressure. This eliminates the necessity of installing, maintaining and operating a group of pumps which would be necessary to draw off the fractions against the minus pressure were the condensers situated on or near the ground.

The vapors which remain after condensation in the bubble tower sections or fractions having boiling points below about 350°, for example, and which may consist of steam and entrained light oil vapors are permitted to pass from the last section or sections of the multiple condensing unit through a water-cooled heat exchanger where the final condensation of the steam and lighter hydrocarbon fractions is accomplished. The final condensate of water and lighter hydrocarbons is run down through the barometric leg to a receiving tank where separation of the water occurs and from which the water may be drawn off, leaving the light oil fraction which can be used as a reflux oil or as fuel or for other purposes.

The several grades of unfinished lubricating oils accumulated in the run down tanks from the condensers may be further treated as with contact clay and filtration to suitably finish the oil for placing same on the market.

Inasmuch as it is desirable to contact the crude charging stock with heated water in the preliminary purification step, it is advantageous according to this invention to use as a source of heated water, water which has been heated in the heat exchanger wherein the steam and light hydrocarbons are condensed. Water from the coolers below the condensers is also used for this purpose.

Further purposes, novel features and advantages will appear in the following more detailed description illustrative of this invention in connection with the accompanying drawings, wherein.

Figure 1:
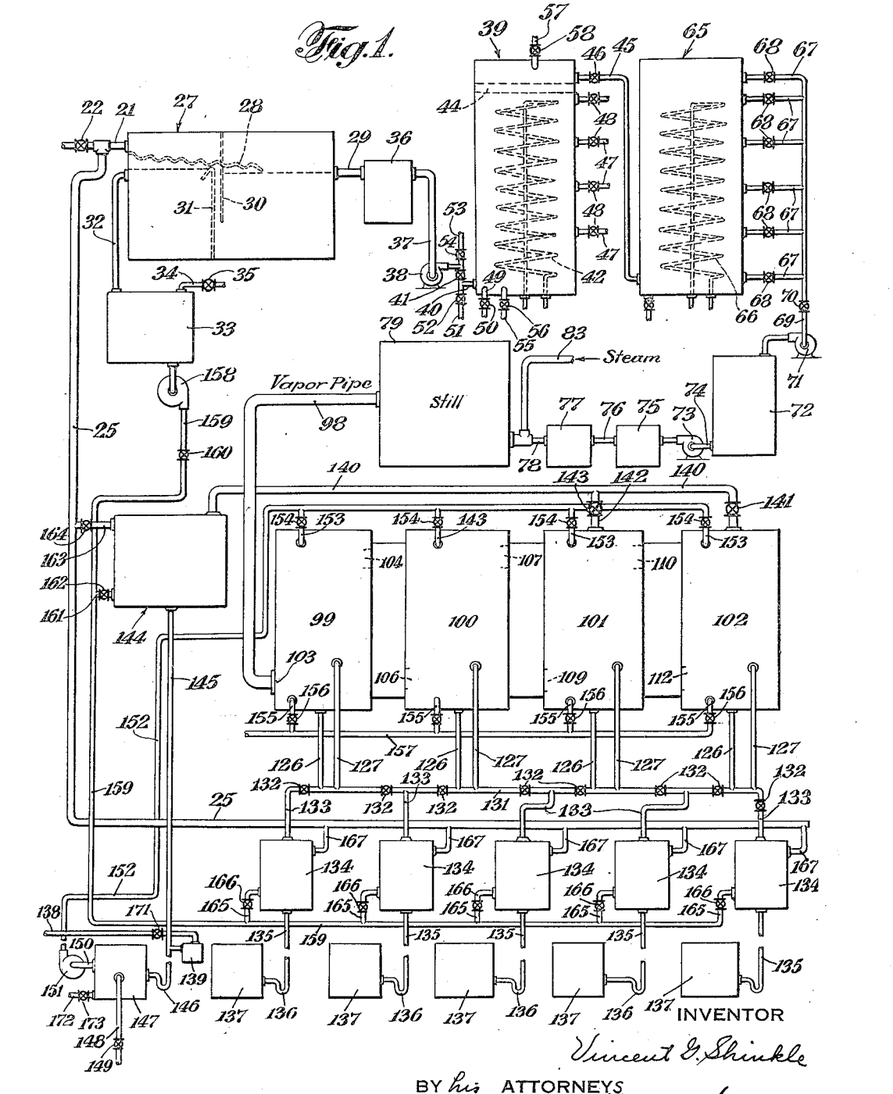
Figure 1 is a flow sheet largely diagrammatical of apparatus comprising the invention and whereby the invention may be practiced.

Charging stock from any suitable receiving tank, not shown, is admitted to the system by line 21 controlled by valve 22. Warm water from the coolers 134 and heat exchanger 144 flows through line 25 into line 21 where it is mixed with the crude charging stock, e. g., waste crank case oil. The mixture of impure oil and water is then admitted into separator 27.

Separator 27 may be of any suitable construction. It is preferable, however, to employ a separator such as the separator heretofore known and shown in United States Patents No. 1,702,612 and No. 1,702,613 to Morse. In a separator of the latter construction a mixture of oil and heated water is permitted to flow over riffle board 28 so as to afford intimate contact between the hot water and the impure crude and so that the crude may be washed by the heated water. After passing over the riffle board the crude and hot water are permitted to settle so that the washed crude comes to the surface and is drawn off by line 29. Foreign matter washed from the crude settles to the bottom of the separator and may be periodically removed. The water is permitted to flow between baffle boards 30 and 31 so as to segregate the water from the oil and permit further settling of the foreign matter from the water. The water is taken from separator 27 by line 32 to cooling tank 33 from which it may be taken after cooling for use in condensers or coolers hereinafter to be described. When necessary, fresh water may be added to cooling tank 33 by line 34 controlled by valve 35.

The crude charging stock may be introduced into the system at about atmospheric temperatures, namely, about 60° or 70° F. The water with which it is mixed is preferably heated to about 140° F. though considerable variation in the temperature of the water is allowable. The water is used in a heated condition in order to decrease the viscosity of the oil with which it is mixed and to thus promote the flow of the oil and the surface contact between the water and the oil. The temperatures at which it is desirable to use the water may advantageously range from 100° F. to 180° F. In ordinary practice a fairly constant flow of water may be maintained, for example, about 100 gallons per minute. The flow of oil may be intermittent or continuous as desired. It is preferable to have the amount of oil not more than about one-third that of the water used. Where this is the case and where the water is introduced at a temperature of about 140° F., the mixture of oil and water will flow through the separator at about 120° F.

The purifying operation above described using separator 27 comprises no part of this invention and other means than that described above may be substituted therefor. It has been found, however, that such washing operation does not completely purify the oil but merely delivers the oil in a semi-purified condition. Thus it has been found that the oil flowing from separator 27 holds in suspension finely divided matter such as carbon, metal and other foreign elements and also contains emulsions such as emulsions of water and oil. Especially where emulsifying agents such as fatty acids or soaps or other colloids are present in the crude charging stock, are these emulsions likely to occur in the oil even after treatment in separator 27.

It is desirable, therefore, to further purify the oil coming from separator 27. This has been accomplished according to this invention by the following means. The oil flowing from separator 27 by line 29 is conducted to sump 36 from which it is pumped through lines 37 and 40 by pump 38 into treating tank 39 preferably at a point adjacent to the bottom thereof.

Figure 2:
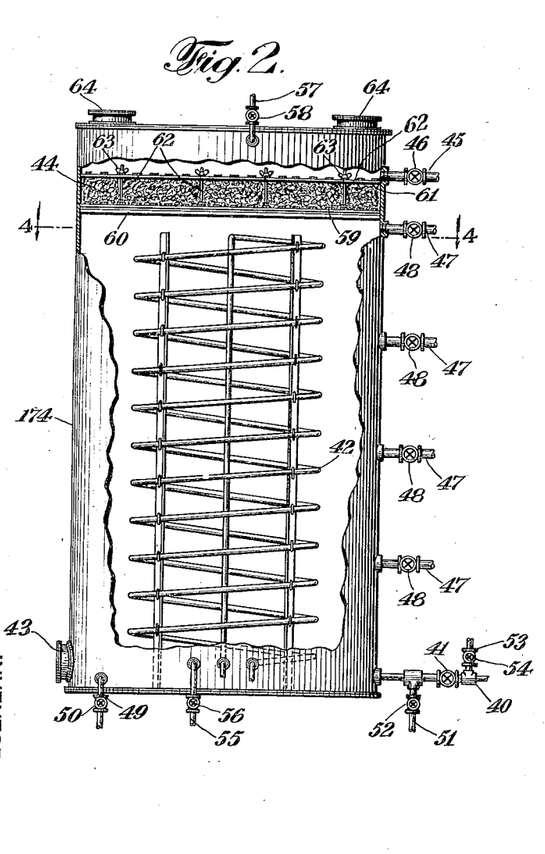
Fig. 2 is a side elevation of the treating tank with parts cut away.
Figure 3:
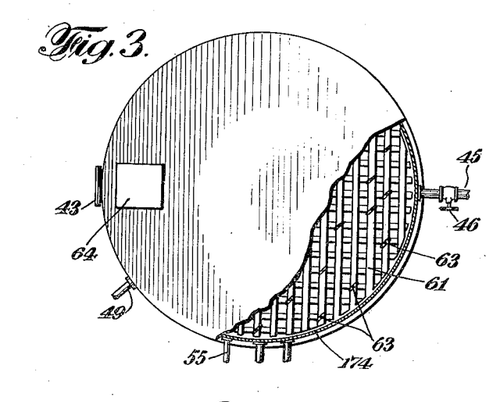
Fig. 3 is a top view of the treating tank with a portion removed.
Figure 4:
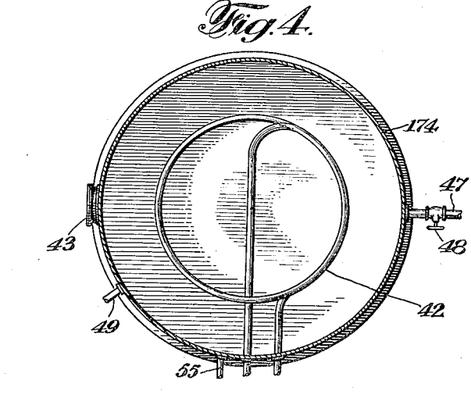
Fig. 4 is a plan view of the treating tank taken on the line 4—4 of Fig. 2.

Detail as to treating tank 39 is shown in Figs. 2, 3 and 4. Treating tank 39 is of preferably relatively large size. The casing 174 of the tank may, for example, be sixteen feet in diameter and thirty feet high. Partly purified crude is permitted to flow into tank 39 by line 40 controlled by valve 41 and due to the relatively large size of the tank rises gradually therein. The oil in tank 39 is heated by steam coil 42 and is kept therein preferably at a temperature of about 180° F. though considerable variation in the temperature of the oil is permissible. Any suspended matter and emulsified material is given opportunity to settle in treating tank 39. Treating tank 39 may be cleansed of matter deposited therein from time to time by manhole 43. Near the top of the treating tank the oil passes upward and through a mat of excelsior 44 which may be, for example, about eighteen inches thick. The oil after having passed through the mat of excelsior is discharged from treating tank 39 by line 45 controlled by valve 46.

For purposes of sampling the oil in treating tank 39 a number of draw-offs 47 are provided, controlled by valves 48 so that oil at different levels therein may be removed and examined as desired. In addition to the above draw-offs, an additional draw-off line 49 controlled by valve 50 may be provided at the bottom of the tank and draw-off line 51 controlled by valve 52 may be provided leading from inlet line 40 so that by closing valve 41 in line 40 oil from tank 39 may be withdrawn by means of line 51. If desirable, withdrawn portions of oil may be reworked through separator 27 or they may be otherwise disposed of. Any water which settles in tank 39 may be drawn off by draw-off line 49 though oil may be also withdrawn from this draw-off if it is desired to do so.

Treating tank 39 affords advantageous means for treating the oil with a chemical if it is desired to do so. For example, oil in tank 39 may be treated with caustic solution, sodium silicate and the like in order to facilitate the elimination of suspended impurities and to give the oil better color. To this end, chemical may be introduced as by line 53 controlled by valve 54 into oil flowing into tank 39 by line 40. Where chemical is introduced into oil in tank 39, the oil and chemical may be agitated as by admitting compressed air thereto by line 55 controlled by valve 56. The air may be permitted to escape from tank 39 by line 57 controlled by valve 58 at the top of the tank.

The excelsior mat 44 is positioned between a lower layer of lattice work 59 resting on channels 60 and an upper layer of lattice work 61. Excelsior mat 44 may be maintained and compacted to desirable degree between lower lattice 59 and upper lattice 61 by means of bolts 62 fastened to lower lattice 59 and extending through upper lattice 61 and which are secured by wing nuts 63. Manholes 64 make available the excelsior mat so that the excelsior therein may be changed when necessary.

The excelsior mat apparently has an affinity for moisture or colloid substances in the crude and also serves to break up any emulsions. The excelsior mat has been found to last for a considerable period of time, e. g., three to six months without necessity for replacement. Moreover, the excelsior mat has been found to permit the oil to flow freely therethrough and not to clog even after continued periods of operation.

The treating tank 39 wherein the oil is permitted to slowly rise in a heated state through a mat of excelsior has been found to purify the oil of suspended matter and emulsions to an extraordinarily high degree. Moreover, the apparatus is simple and inexpensive.

The crude oil which has been purified as above described is passed from treating tank 39 by line 45 to one or more storage tanks 65. The oil in storage tanks 65 may be heated if desired by means of steam coil 66, to permit easy handling. While the extent of heating may be subject to wide variation, it is preferable to maintain the oil in storage tanks 65 at above 180° F. Draw-offs 67 controlled by valves 68 are provided at different levels of the storage tank 65 for withdrawing oil therefrom. Oil thus withdrawn is pumped by pump 71 through line 69 controlled by valve 70 to one or more service tanks 72 which are merely convenient for temporary storage and for the purpose of measuring out quantities of oil and making tests thereof. From the service tanks 72 oil is pumped by pump 73 through line 74, through meter 75, through line 76, and through control tank 77. By line 78 the oil is introduced into still 79.

Details of still 79 showing novel features, improvements and advantages of this invention are illustrated in Figs. 5, 6, 7, 8 and 9. The purified crude oil flowing into the still by line 78 is introduced into pipe 80 which may be shaped in a helical pipe coil and which is encased in a steel pipe 81 which may rest on the floor 82 in the furnace 169 of the still or be suspended on a wall or other part thereof. The oil in helical coil 80 is subjected only to heat derived from saturated and partially superheated steam in pipe 81. Steam is introduced into pipe 81 from any suitable source of steam, not shown, by pipe 83. The pipe on the floor of the furnace picks up a great deal of radiant heat and sensible heat from the hot gases of the furnace.

The oil which has been heated in helical coil 80 but which is still in liquid form is conducted therefrom by lines 84 and 85 to the top of the furnace. The steam which may be wholly or partially super-heated also passes upward through a separate pipe 86, also leading to the top of the furnace.

Figure 5:
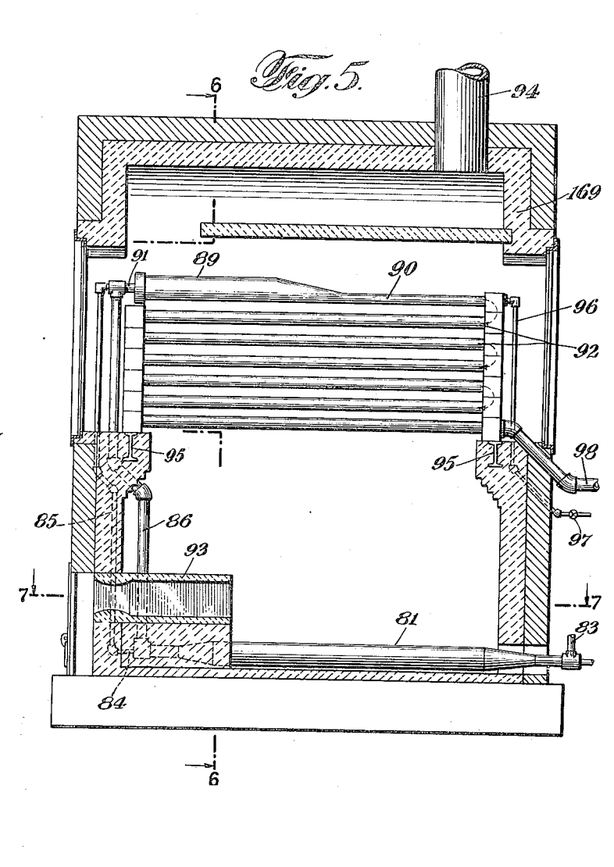
Fig. 5 is a cross-sectional view of the still in side elevation.
Figure 8:
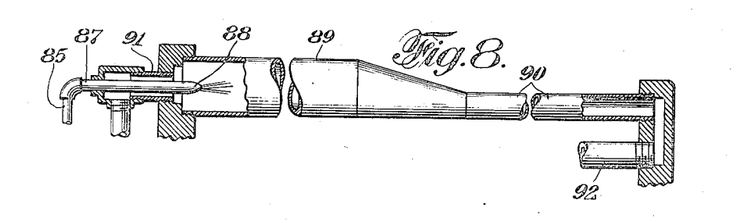
Fig. 8 is a side view partly in section of the oil atomizer and part of the top pipes of the super-heating coil of the still.
Figure 9:
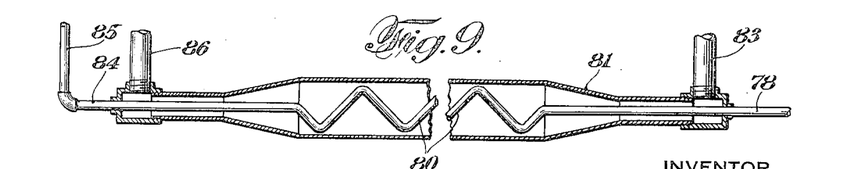
Fig. 9 is a side view partly in section of the oil heating coil and steam jacket therefor.

The heated liquid oil under pressure maintained by pump 73 is conducted by line 87 to atomizing nozzle 88. The atomized oil is discharged into an enlarged portion 89 of the topmost pipe 90 of a heating unit which may comprise a bank of superheating coils. The partially super-heated steam is also discharged into enlarged portion 89 through outlet or jet 91 situated behind atomizing nozzle 88. Due to the heat of the oil and steam and heat of the super-heating coil, the oil is flashed into a vapor. Thereupon the mixture of oil vapor and superheated steam progresses downward through the bank of superheating pipes 92 until the mixture reaches desired temperature for fractionation.

While the pressure and temperature of the oil is subject to considerable variation, it is preferable to maintain the oil prior to atomizing at a pressure of about 100 to 125 pounds per square inch. The temperature of the oil prior to atomizing may be about 350° F. It is found that satisfactory results are obtained where the weight of steam varies from about half to equal that of the oil. Other methods and apparatus for atomizing oil into superheating coils containing steam or into a current or jet of steam maintained therein may also be employed according to this invention, though the construction above described is regarded as preferable.

The mixture of vaporized oil and superheated steam is heated in the superheating coil to temperatures such as from 650° to 800° F. After the oil has been atomized, the pressure maintained in the pipes 92 of the superheating coil may be maintained preferably at about ten pounds per square inch or less.

Figure 6:
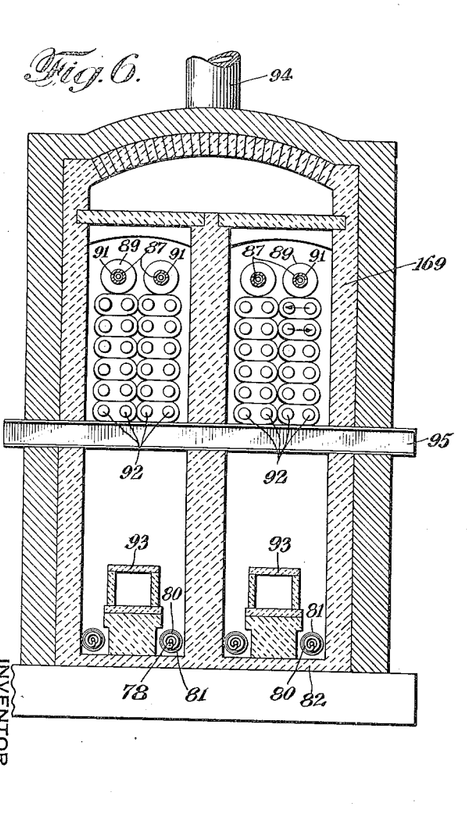
Fig. 6 is a cross-sectional view of the still in front elevation taken on the line 6—6 of Fig. 5.
Figure 7:
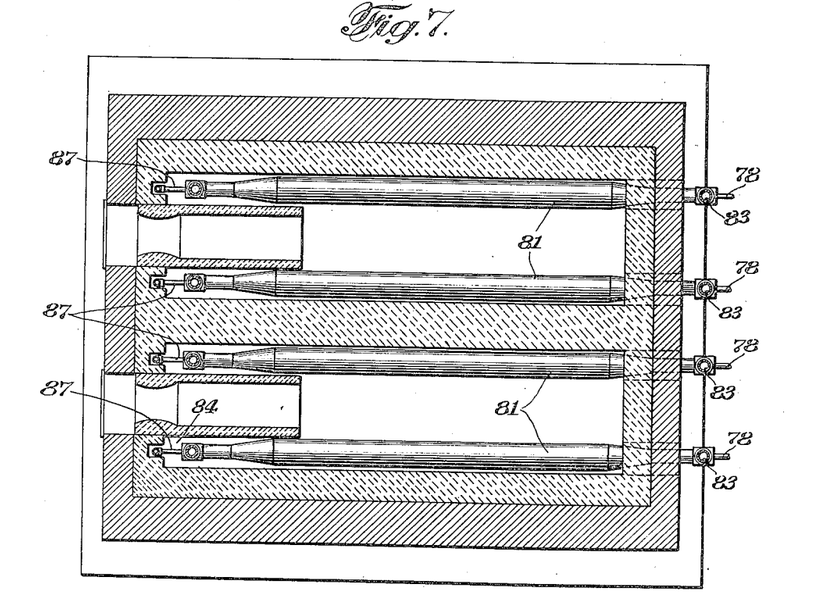
Fig. 7 is a plan view of the still taken on the line 7—7 of Fig. 5.

Any suitable source of heat may be employed in the furnace of the still. It has been found, however, that a carborundum furnace 93 burning fuel oil will give satisfactory results. In this type of furnace, the combustion is substantially complete in the combustion chamber and pipes 92 of the superheating coils and pipe 81 are heated by hot gases and radiant heat in still chamber 169. The still chamber 169 may be of any well known construction permitting the pipe 81 to be exposed to the hot gases and radiant heat and permitting the hot gases to pass upward through superheating pipes 92 and outward through stack 94. The bank of superheating pipes may be supported by any suitable means such as I-beams 95. For blowing out the superheating pipes 92, steam may be admitted thereto through line 96 controlled by valve 97.

In a still having the above construction, it is apparent that heat is applied to the oil while in liquid state by heat exchange with steam. It is of advantage according to this invention that this steam is in turn supplied with heat by heat exchange with hot gases which may be in the chamber of the still. By this means the oil while in a liquid state is prevented from being subjected to direct furnace heat with consequent overheating beyond the point of molecular instability. Moreover the pipe containing the oil in liquid state is heated uniformly on all sides thereof, thus preventing local overheating beyond the point of instability of the molecule. Moreover when the oil is vaporized by atomization into the bank of superheating coils, it is discharged into a stream of superheated steam which protects the oil. This fact coupled with the enlargement of the superheating coil at the point of introduction prevents atomized oil from coming in contact with the heated walls of the superheating pipe oils. This further prevents local overheating of oil beyond the point of molecular instability. These advantages are secured by simple means and means which efficiently utilize heat necessary for heating the oil.

The flow of oil vapor and superheated steam through the pipes of the bank of superheating coils is preferably rapid. This is advantageous particularly in the bottom pipes of the coil which are directly in the heat zone of the still chamber. It is preferable not to maintain the oil vapor in the bottom pipe in the heat zone for a longer period than about three seconds.

The mixture of oil vapors and steam, having been brought to appropriate temperature in still 79, passes therefrom into vapor line 98. While the temperature to which it is desirable to bring the oil vapors is subject to considerable variation, it is preferable ordinarily to bring them to a temperature of from 650° F. to 800° F. Vapor line 98 carries the oil vapors and steam to a multiple condenser or dephlegmator unit of special construction and operation whereby desired oil fractions may be withdrawn. The condensing unit differs from an ordinary bubble or fractionating tower, among other things, in that it is constructed in a number of adjacent vertical sections, here shown four in number, i. e. sections 99, 100, 101 and 102. Other novel features relate to the bubble plate and bubble cap construction, means for conducting the vapors from one section to another, draw-off lines, and to other features of construction and operation which are shown in Figs. 10, 11, 12, 13, 14 and 15.

Figure 12:
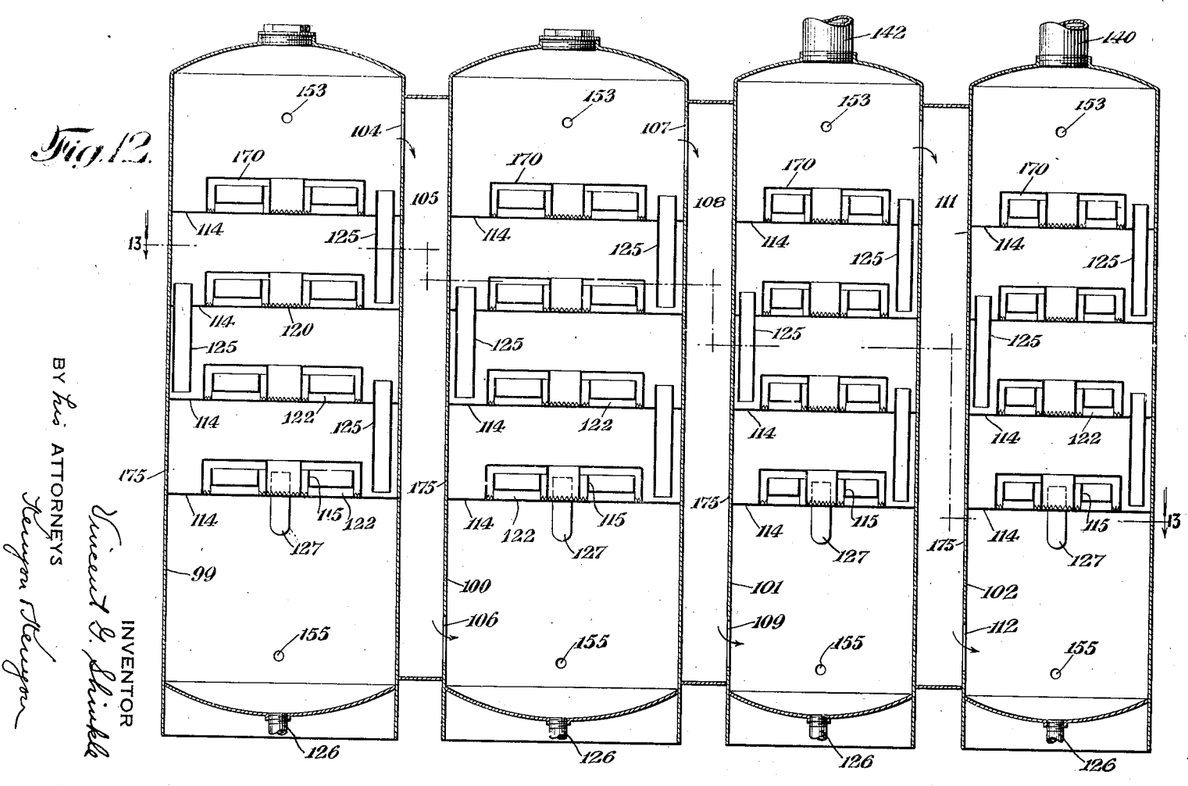
Fig. 12 is a sectional elevation of the fractionating condensers.
Figures 13, 14, 15:
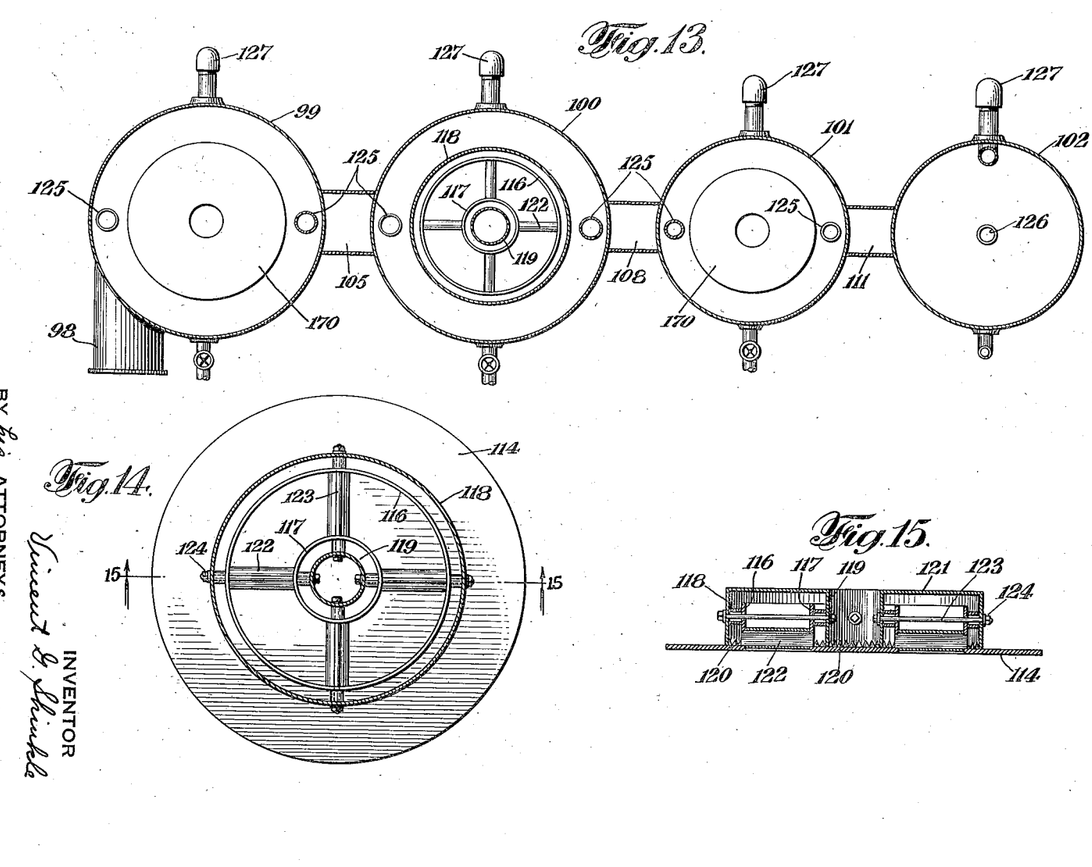
Fig. 13 is a plan view of the fractionating condensers in the line 13—13 of Fig. 12.
Fig. 14 is a plan view of one of the bubble decks with bubble cup in place.
Fig. 15 is a sectional elevation taken on the line 15—15 of Fig. 14.

The vapors may pass successively through the various sections of the condensing unit. Vapors from vapor line 98 pass into the lower part of section 99, and pass therein upwardly through bubble plates 114 therein supported by casing 175 thereof, escaping at an opening 104 at the top thereof and then pass by channel 105 to an opening 106 adjacent the bottom of section 100. Similarly, the vapors pass from the top of section 100 to the lower part of section 101 by opening 107, channel 108 and opening 109. The vapors pass from the upper part of section 101 through opening 110 by channel 111 to opening 112 in the lower part of section 102. It is advantageous to have part of the wall of passages or channels 105, 108, and 111 comprising also a part of the walls, casings 175, of sections 99, 100, 101 and 102 of the condensing unit as this construction prevents loss of heat by piping.

The bubble plate and bubble cap construction is as follows: A single bubble cap will be described for purposes of convenience. Vapors are permitted to rise through a bubble plate 114 by chimney 115 therein. Chimney 115 is preferably constructed having an outer circular wall 116 and an inner concentric circular wall 117, the chimney being between said walls. A single large bubble cap 170 is adapted to fit over the chimney and preferably has an outer circular wall 118 and an inner circular wall 119 which force the vapor rising in chimney 115 to bubble under notches 120 at the lower edges of both inner wall 118 and outer wall 119. In order to permit condensing liquid which may flow into the space within the inner wall 118 of bubble cap 170 to flow outside of the bubble cap, openings or pipes 122 are provided between walls 116 and 117 of chimneys 115. The bubble caps are held in suitable position with respect to bubble plates 114 by means of bolts 123 passing through openings in walls 116 and 117 of chimney 115 and openings in walls 118 and 119 of the bubble cap. The bolts may be held in position by means of suitable nuts 124. Non-circular chimneys and bubble plates may also be used.

As the oil vapors lose temperature, the several condensible fractions will remain on the plates or in the bottoms of the several sections according to the descending order of their boiling points. Condensed liquid which accumulates on each of bubble plates 114 is permitted to flow downward to the next bubble plate below by means of pipes 125 which extend above each of plates 114 to the depth of liquid which it is desired to have maintained thereon and extend below the plate so as to form a vapor seal with liquid maintained on the next bubble plate below. Below the lowermost bubble plate of each section of the condensing unit is a chamber in which some of the vapor condenses and collects as a liquid and from which condensed vapor may be withdrawn through pipes 126. Condensing liquid collected on the lowermost bubble plate in each of the sections is withdrawn through line 127 which enters each of the sections and rises above the bubble plate sufficiently to maintain a desired level of liquid thereon. For purposes of testing the condensing liquid on all the other bubble plates of the sections of the condensing unit, draw-off pipes 128 controlled by valves 129 are provided. Thermometers 130 may also be provided in connection with the sections of the condensing unit.

Figure 10:
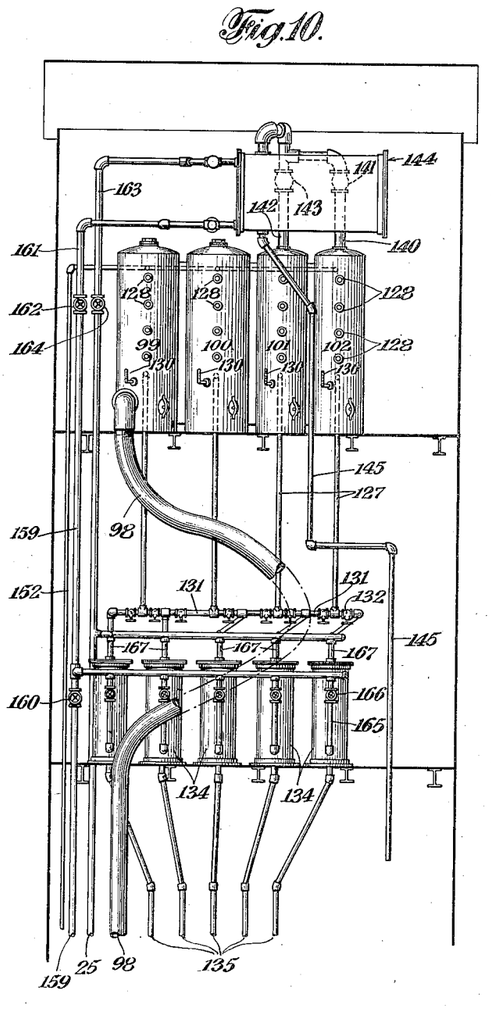
Fig. 10 is a front elevation of the fractionating condensers, heat exchanger, coolers and piping arrangement therefor.
Figure 11:
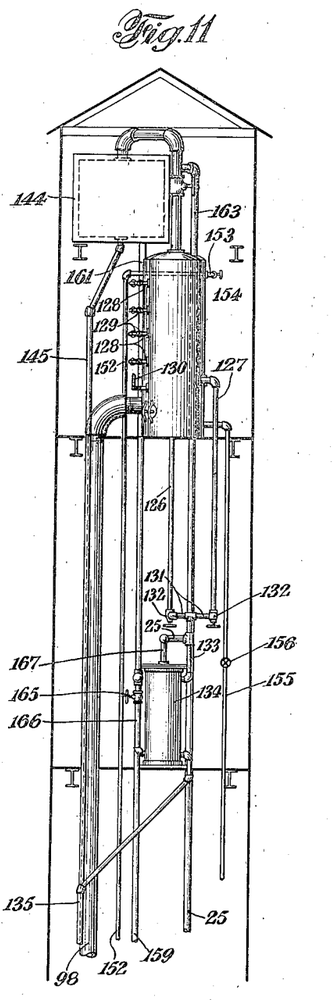
Fig. 11 is a side elevation of the apparatus shown in Fig. 10.

The condensed liquid which flows from the condensing unit sections by lines 126 and/or 127, passes to a series of lines 131 controlled by valves 132 which permit the fractions to be blended with one another or to be kept separate from the rest. The separate fractions or desired blends of fractions are thereafter conducted by lines 133 to coolers 134 where the hot condensed liquid is cooled by heat exchange with water. The cooled oil fractions run down from coolers 134 by lines 135.

Since the condensing unit composed of sections 99, 100, 101 and 102 is preferably maintained under a vacuum of about 28 inches of mercury, it is advantageous to have the condensing unit and coolers 134 placed so as to permit run down pipes 135 to be extended downwardly a considerable distance, for example about 45 feet. This provides a barometric leg through which the oil descends, under its own hydrostatic pressure, to the run-down tanks 137. The liquid static pressure will be at least equal to the pressure difference between atmospheric pressure and the pressure maintained in the condensing unit. By this arrangement there is eliminated the necessity for installing, maintaining and operating a group of pumps which would be required to draw off the fractions against the vacuum were the run-down pipes of less length. At the bottom of each run-down line 135, a trap 136 may be placed in connection with receiving tanks 137, thus forming a simple barometric leg and means for collecting the condensed liquid. In order to build up and maintain a vacuum, vacuum line 138 controlled by valve 171 may be connected through trap 139 to the line 145 where the light oil and steam condensates are drawn from the overhead heat-exchanger or condenser 144.

The vapors remaining after condensation of the fractions condensed in the condensing unit and which may have boiling points below approximately 350° F., may consist of steam and entrained oil vapors having boiling points not over approximately 350° F. These are ordinarily withdrawn from the last section 102 of the condensing unit by vapor line 140 controlled by valve 141. If it is desirable to do so, vapor may also be withdrawn from other sections of the condensing unit such as section 101 as by line 142 controlled by valve 143.

The vapors pass by vapor line 140 to heat exchanger 144 where they are cooled and condensed by heat exchange with cold water. The condensed vapors comprising water and lighter oil may run down from heat exchanger 144 by run-down line 145, which may be made of sufficient length to form a barometric leg and which may lead through trap 146 into receiving tank 147 where the oil and water may be permitted to separate, the water drained off and the oil withdrawn by line 148 controlled by valve 149 for use as fuel or other purposes or may be recirculated as reflux oil. If it is desired to use the oil as reflux, this may be accomplished by withdrawing it from tank 147 by line 150 and pumping the oil by pump 151 through line 152 and lines 153 controlled by valves 154 which lead into sections of the condensing unit. Water may be withdrawn from tank 147 by line 172 controlled by valve 173.

The accumulation of condensible fractions on the bubble plates of the sections of the condensing unit may be controlled by the amount of reflux oil which is pumped into the sections of the condensing unit and may also be controlled by introducing superheated steam introduced into the bottom chamber of the sections by lines 155 controlled by valves 156 which lead from header 157.

The water which is used in heat exchanger 144 and in coolers 134 may be pumped from cooling tank 33 by pump 158 through line 159 controlled by valve 160. Cold water may be introduced into heat exchanger 144 by line 161 controlled by valve 162. Cooling water passing continuously through heat exchanger 144 is removed therefrom by line 163 controlled by valve 164 through line 25 and separator 27 to cooling basin 33. Cold water may be introduced into coolers 134 from line 159 by means of lines 165 controlled by valves 166. The waste water flowing from coolers 134 flows therefrom by lines 167 into return line 25 which discharges the heated water through the separator 27 into cooling basin 33. As before mentioned, the hot water from coolers and condensers may be used in the separators 27 to blend with the incoming crude charging stock for the preliminary washing thereof.

Several grades of unfinished lubricating oils which accumulate in run-down tanks 137 may be further treated, if it is desired to do so, as by means of contact clay and/or filtering and the like.

The above described method and apparatus affords efficient and relatively inexpensive means for producing oil fractions such as fractions desirable for lubricating oil purposes and ready for the market. It also provides highly useful, practical and efficient means whereby used crank case oil containing many solid and liquid impurities and many different hydrocarbons and diluents, may be treated so as to produce therefrom lubricating oils of high purity.

While specific methods of operation and specific apparatus have been described, it is to be understood that this has been done for purposes of illustration merely and that the true scope of this invention is not limited thereby.

I claim:

1. A method of treating used crank case oil comprising washing said oil with water, separating the oil from the water and from solid and liquid impurities, heating said oil by out-of-contact heat exchange with superheated steam, producing flash vaporization of said oil substantially without cracking by atomizing said oil in a current of steam which is at a substantially lower pressure than said superheated steam used in the heat exchange step to make a mixture of vaporized oil and steam, heating said mixture of oil vapor and steam by heat exchange with furnace gases to a temperature substantially above the temperature of said superheated steam used in the heat exchange step, and condensing oil fractions of said hot mixture of oil vapor and steam.

2. A method of treating an oil comprising purifying said oil of solid impurities, heating said oil substantially without cracking in a liquid state by out-of-contact heat exchange with superheated steam, producing flash vaporization of said oil substantially without cracking by atomizing said oil into superheated steam which is at a substantially lower pressure than said superheated steam used in the heat exchange step to vaporize said oil, heating said mixture of oil vapor and steam to a temperature which is substantially higher than the temperature of said superheated steam used in the heat exchange step and condensing oil fractions from said hot mixture of oil vapor and steam.

3. A method of vaporizing an oil comprising maintaining said oil under pressure in a liquid state, heating said liquid oil while under pressure by heat exchange with superheated steam, vaporizing said oil substantially without cracking by atomizing said oil into superheated steam, permitting the pressure of the oil to drop during the atomizing step, and heating the mixture of vaporized oil and steam while maintaining the mixture in rapid motion, by direct heat exchange with hot gases.

4. A method of vaporizing an oil comprising flowing said oil substantially without cracking under pressure in heat exchange with a current of superheated steam, vaporizing said oil substantially instantaneously and substantially without cracking by atomizing said oil while reducing the pressure thereof to a small proportion of the oil pressure maintained in the heat exchange step in a current of said superheated steam which steam in said current is at a pressure substantially below the pressure of the steam used in the heat exchange step and heating said mixture of oil vapor and steam.

5. A method of vaporizing an oil comprising flowing said oil substantially without cracking under pressure in heat exchange with a current of superheated steam, supplying heat to said superheated steam by heat exchange with hot gases simultaneously with the heating of said oil by heat exchange with said superheated steam, vaporizing said oil substantially instantaneously and substantially without cracking by atomizing said oil while reducing the pressure thereof in a current of said superheated steam which steam in said current is at a pressure substantially below the pressure of said superheated steam used in the heat exchange step and heating said mixture of oil vapor and steam while maintaining the mixture in rapid motion.

6. A method of vaporizing an oil comprising preheating said oil at high pressure and atomizing said preheated oil in a liquid state in a current of superheated steam into a retort, said oil being initially contacted with said steam in said retort while said steam is at a pressure not substantially above that maintained throughout said retort.

7. A still for vaporizing oil comprising a heating unit for heating said oil by heat exchange with hot gases, a steam jet for discharging steam into said heating unit, and an oil atomizer for discharging said oil in an atomized condition into a jet of steam discharged by said steam jet, said oil atomizer being positioned with respect to said steam jet so that oil discharged from said oil atomizer initially contacts with a jet of steam discharged from said steam jet after the pressure of said jet of steam has been reduced to a pressure not substantially above that maintained in said heating unit.

8. In a still for vaporizing oil, the combination comprising heat exchange means for heating said oil in liquid phase by out-of-contact heat exchange with superheated steam at high pressure, a heating unit, means for maintaining steam in said heating unit at a substantially lower pressure and at a substantially higher temperature than the pressure and temperature respectively of the steam in said heat exchange means, and means for atomizing said oil into said heating unit into contact with steam at the pressure of said steam in said heating unit to accomplish flash vaporization of said oil.

9. A still for vaporizing oil comprising means for heating said oil by heat exchange with superheated steam, means for supplying heat to said superheated steam by heat exchange with hot gases simultaneously with the heating of said oil by heat exchange with said steam, a heating unit for heating said oil by heat exchange with hot gases, means for introducing steam into said heating unit, and an oil atomizer for discharging said oil as a liquid and in an atomized condition into an atmosphere of steam at low pressure in said heating unit to accomplish flash vaporization of said oil substantially without cracking said oil.

10. A still for vaporizing oil comprising means for heating said oil by heat exchange with superheated steam, means for supplying heat to said superheated steam by heat exchange with hot gases, a heating unit for heating said oil by heat exchange with hot gases, a steam jet for discharging steam into said heating unit, means for reducing the pressure of said steam in said heating unit, an oil atomizer for discharging said oil in an atomized condition into an atmosphere of steam in said heating unit after the pressure of said steam has been reduced by said pressure-reducing means, and means for passing said mixture of oil vapor and steam through said heating unit at a high rate of speed.

11. A still for vaporizing oil comprising a chamber, a furnace for heating said chamber by hot gases, a steam casing in said chamber, a pipe within said casing for heating oil by heat exchange with steam in said casing, a bank of heating coils, means for introducing steam into said heating coils, means for reducing the pressure of said steam in said coils before oil is contacted therewith and means for introducing oil in an atomized condition into an atmosphere of steam at reduced pressure in said heating coils.

12. A still for vaporizing oil comprising a chamber, a furnace for heating said chamber by sensible and radiant heat of hot gases, a casing for steam on the floor of said chamber, a pipe within said casing for heating oil by heat exchange with steam in said casing, a bank of heating coils, a steam jet for discharging steam into an enlarged portion of said heating coils, and an oil atomizer spaced from said steam jet for introducing liquid oil in an atomized condition into said jet of steam after said steam has left said jet.

VINCENT G. SHINKLE.